United States Patent
Witschnig et al.

(10) Patent No.: US 8,078,125 B2
(45) Date of Patent: Dec. 13, 2011

(54) METHOD FOR DEMODULATING A MODULATED SIGNAL, DEMODULATOR AND RECEIVER

(75) Inventors: Harald Witschnig, Gratkom (AT); Johannes Bruckbauer, Treubach (AT)

(73) Assignee: NXP B.V., Eindhoven (NL)

(*) Notice: Subject to any disclaimer, the term of this patent is extended or adjusted under 35 U.S.C. 154(b) by 465 days.

(21) Appl. No.: 12/306,148

(22) PCT Filed: May 16, 2007

(86) PCT No.: PCT/IB2007/051879
§ 371 (c)(1),
(2), (4) Date: Dec. 22, 2008

(87) PCT Pub. No.: WO2007/148242
PCT Pub. Date: Dec. 27, 2007

(65) Prior Publication Data
US 2009/0280763 A1  Nov. 12, 2009

(30) Foreign Application Priority Data
Jun. 21, 2006 (EP) .................... 06115779

(51) Int. Cl.
*H04B 1/16* (2006.01)
(52) U.S. Cl. .................... 455/205; 455/42
(58) Field of Classification Search .......... 455/23, 455/205, 108, 42–44
See application file for complete search history.

(56) References Cited

U.S. PATENT DOCUMENTS

| 5,369,670 | A | 11/1994 | Zagloul et al. | |
|---|---|---|---|---|
| 5,694,419 | A | 12/1997 | Lawrence | |
| 6,213,402 | B1 | 4/2001 | Reiner | |
| 6,671,333 | B1 | 12/2003 | Lucioni | |
| 7,054,358 | B2 * | 5/2006 | Yamaguchi et al. | 375/226 |
| 7,636,387 | B2 * | 12/2009 | Yamaguchi et al. | 375/224 |
| 2003/0185405 | A1 * | 10/2003 | Spencer et al. | 381/77 |
| 2009/0154717 | A1 * | 6/2009 | Hoshuyama | 381/66 |

FOREIGN PATENT DOCUMENTS

| DE | 4219417 A1 | 12/1993 |
|---|---|---|
| EP | 0899682 A2 | 3/1999 |
| GB | 2382282 A | 11/2001 |

OTHER PUBLICATIONS

Taira, S. "On Automatic Classification of Analogue Modulation Signals and FSK Signals", Second Research Center, Technical Research and Development Institute, Japan Defense Agency, The Institute of Electronics, Information and Communication Engineers (IEICE), Technical Report of IEICE, vol. 98, No. 404, 9 pgs. (Nov. 19, 1998) (English Abstract Included).

* cited by examiner

*Primary Examiner* — An Luu

(57) ABSTRACT

A demodulator (6) for demodulating a modulated signal (3) comprises a Hubert transformer (7) for generating a Hubert transformed modulated signal (18) of the modulated signal (3). The Hubert transformed modulated signal (18) comprises modulated (5) and unmodulated signal sequences (4) and originates from an unmodulated signal. The demodulator (6) further comprises a comparing device (14) for comparing the Hubert transformed modulated signal (18) with a reference signal (15), which corresponds to the Hubert transformed unmodulated signal. The demodulator (6) is further configured to identify the modulated and unmodulated signal sequences (4, 5) based on the comparison.

11 Claims, 4 Drawing Sheets

METHOD FOR DEMODULATING A MODULATED SIGNAL, DEMODULATOR AND RECEIVER

FIELD OF THE INVENTION

The invention relates to a method for demodulating a modulated signal, to a demodulator, and to a receiver.

BACKGROUND OF THE INVENTION

As disclosed in Klaus Finkenzeller, "RFID-Handbuch, Grundlagen und praktische Anwendungen induktiver Funkanlagen, Transponder und kontaktloser Chipkarten", $3^{rd}$ edition, Hanser, Munich, 2002, one common method to transmit data from an RFID transponder or tag to a reader is load modulation, which is a special form of amplitude modulation. When being close to the reader, then the transponder is inductively coupled to the reader. The reader transmits a magnetic field and the transponder represents a load for the reader. By adjusting the load impedance of the transponder by, for instance, adjusting the load resistance or the capacitance of the transponder, the transformed impedance at the reader can be varied, resulting in a varying voltage across the antenna of the reader. Thus, load modulation is achieved.

Conventional RFID systems based on load modulation are limited by the achievable data rate and the ratio between the amplitude of the carrier signal and the modulated sequence.

OBJECT AND SUMMARY OF THE INVENTION

It is an object of the present invention to provide an improved method for demodulating a modulated, particularly a load modulated signal.

Further objects of the present invention are to provide a corresponding demodulator and a receiver.

The object is achieved in accordance with the invention by means of a method for demodulating a modulated signal, the method comprising the steps of:

receiving a modulated signal, which comprises modulated and unmodulated signal sequences and originates from an unmodulated signal;

generating a Hilbert transformed modulated signal by subjecting the modulated signal to the Hilbert transform;

comparing at least indirectly the Hilbert transformed modulated signal with a reference signal, which corresponds to the Hilbert transformed unmodulated signal; and identifying the modulated and unmodulated signal sequences within the modulated signal based on the comparison.

The modulated signal is particularly an amplitude modulated and especially a load modulated signal as is used, for instance, for the communication between a reader and an RFID transponder (tag). Although not restricted to readers and transponders, the inventive method is described for the transponder reader communication using load modulation.

When sending a signal from the transponder to the reader, the transponder is close and magnetically coupled to the reader, as disclosed, for instance, in Klaus Finkenzeller, "RFID-Handbuch, Grundlagen und praktische Anwendungen induktiver Funkanlagen, Transponder und kontaktloser Chipkarten", $3^{rd}$ edition, Hanser, Munich, 2002. The reader generates a magnetic field and the transponder represents a load for the reader. By varying an internal parameter, the load represented by the transponder can be varied, resulting in different voltage signals, z(t), at the antenna of the reader.

Thus, the signal, z(t), has load modulated sequences and unmodulated sequences. The voltage signal, z(t), at the reader antenna is approximately:

$$z(t) = A\sin(\omega t) + q(t) + n(t)$$

wherein $A\sin(\omega t)$ is the carrier signal, q(t) is a signal representing the load modulation, and n(t) is noise. When using load modulation, the signal q(t) is approximately square-shaped and is approximately zero during unmodulated sequences.

According to the inventive method, the signal z(t) is subjected to the Hilbert transform. The Hilbert transform is generally known and is defined as:

$$z_H(t) = \frac{1}{\pi}\int_{-\infty}^{\infty}\frac{z(\tau)}{t-\tau}d\tau$$

wherein $Z_H(t)$ is the Hilbert transformed signal of the signal z(t).

When subjecting the signal z(t) to the Hilbert transform, then the signal part $A\sin(\omega t)$ yields a sinusoidal signal, which is phase-shifted by $-\pi$. The signal q(t), which is related to the load modulation (in general to the amplitude modulation), will also affect the Hilbert transformed signal $Z_H(t)$.

According to the inventive method, the Hilbert transformed signal $Z_H(t)$ is compared with the reference signal, which corresponds to the Hilbert transformed signal of the unmodulated signal. The unmodulated signal equals for this example $A\sin(\omega t)$.

According to the inventive method, this comparison is utilized to identify the modulated and unmodulated signal sequences within the received modulated signal, which may particularly be a load or amplitude modulated signal.

The phase of the Hilbert transformed signal $Z_H(t)$ is affected by the Hilbert transformed signal of the carrier signal $A\sin(\omega t)$ and by the Hilbert transformed signal of the signal q(t). According to a restricted version of the inventive method, the argument of the Hilbert modulated transformed signal is determined and compared with the argument of the reference signal. Then, the modulated sequences and unmodulated sequences are identified within the modulated signal based on the comparison of the two arguments.

The two arguments are compared, according to an embodiment of the inventive method, by obtaining the difference between the argument of the Hilbert transformed modulated signal and the argument of the reference signal, and the modulated and unmodulated signal sequences are identified within the modulated signal based on this difference. The signal q(t) affects the phase of the modulated sequence signals compared to the unmodulated signal. During unmodulated sequence signals, the signal q(t) is approximately zero, so that the phase of the Hilbert transformed modulated signal will not or at least only little differ from the phase of the reference signal. Thus, the characteristics of the difference comprises information about the presence of the unmodulated and modulated signal sequences.

Generating the Hilbert transformed modulated signal may particularly be carried out by the following steps of:

generating a spectral modulated signal by subjecting the modulated signal to a discrete Fourier transform;

generating a filtered spectral modulated signal by filtering the spectral modulated signal with a Hilbert filter; and applying the inverse Fourier transform to the filtered spectral modulated signal.

When realizing the Hilbert filter, which is also referred to as Hilbert transformer, in the discrete domain, then the Hilbert filter is a discrete Hilbert filter and has the following transfer function H(k):

$$H(k) = \begin{cases} -j & \text{for } k = 1, 2, \ldots, N/2 - 1 \\ 0 & \text{for } k = 0, \text{ and } N/2 \\ +j & \text{for } k = N/2 + 1, N/2 + 2, \ldots, N - 1 \end{cases}$$

where $0 \leq k \leq N-1$.

The object of the invention is also achieved in accordance with the invention by means of a demodulator for demodulating a modulated signal, the demodulator comprising:

a Hilbert transformer for generating a Hilbert transformed modulated signal of a modulated signal, which comprises modulated and unmodulated signal sequences and originates from an unmodulated signal; and a comparing device for comparing the Hilbert transformed modulated signal with a reference signal, which corresponds to the Hilbert transformed unmodulated signal; the demodulator being configured to identify the modulated and unmodulated signal sequences based on this comparison.

The modulated signal is particularly an amplitude modulated signal and especially a load modulated signal.

The inventive demodulator may also comprise a functional block for determining the argument of the Hilbert transformed modulated signal, wherein the comparing device is configured to compare the argument of the Hilbert transformed modulated signal with the argument of the reference signal and wherein the demodulator is configured to identify the modulated and unmodulated signal sequences within the modulated signal based on the comparison of the arguments.

In one embodiment of the inventive demodulator, the comparing device is a subtractor for obtaining a difference signal by subtracting the argument of the Hilbert transformed modulated signal from the argument of the reference signal or by subtracting the argument of the reference signal from the argument of the Hilbert transformed modulated signal. Then, the inventive demodulator may be configured to identify the modulated and unmodulated signal sequences within the modulated signal by analyzing the difference signal.

The object is also achieved in accordance with the invention by means of a receiver configured to receive a modulated signal and comprising the inventive demodulator to demodulate the received modulated signal.

The modulated signal is particularly an amplitude modulated signal and especially a load modulated signal and the receiver is particularly a reader, which receives the load modulated signal from an RFID transponder.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

Figure 1:
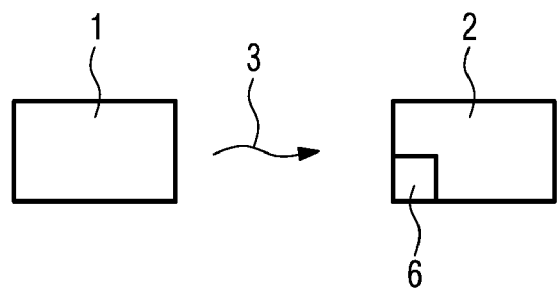
FIG. 1 is a transmitter receiver system.
Figure 2A:
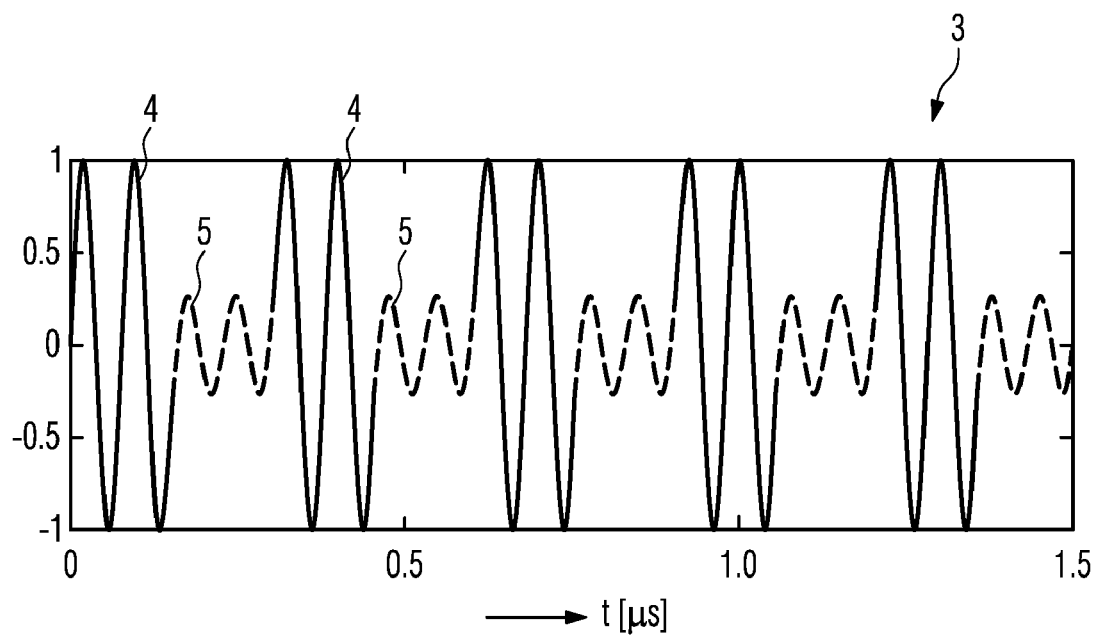
FIGS. 2a-2d show an exemplary load modulated signal and signals derived by a demodulator of the receiver of FIG. 1.

FIG. 1 shows a transmitter, which is an RFID transponder 1 for the exemplary embodiment, and a receiver, which is a reader 2 for the exemplary embodiment. The transponder 1 transmits, as an example of an amplitude modulated signal, a load modulated signal 3 to the reader 2, and the reader 2 receives a corresponding load modulated signal 3 depicted in FIG. 2a. The load modulated signal 3 comprises unmodulated sequences 4 (solid line) and load modulated sequences 5 (dashed line). For the exemplary embodiment, the unmodulated sequences 4 correspond to logic "1" and the modulated sequences 5 correspond to logic "0". However, the inventive method may also be applied to the inverse logic.

The transponder 1 generates the load modulated signal by modulating a carrier signal (unmodulated signal) in a manner well known to the skilled person. Methods to load modulated signals with a transponder are, for instance, known from Klaus Finkenzeller, "RFID-Handbuch, Grundlagen und praktische Anwendungen induktiver Funkanlagen, Transponder und kontaktloser Chipkarten", $3^{rd}$ edition, Hanser Verlag, Munich, 2002.

For the exemplary embodiment, the load modulated signal 3 can be modeled as:

$$u(t) = \sin(\omega t) + q(t) + n(t)$$

wherein $\sin(\omega t)$ is the carrier signal and corresponds to the unmodulated signal, q(t) is a signal representing the load modulation, and n(t) is noise. For the exemplary embodiment, the carrier signal has the amplitude one.

When using load modulation, the signal q(t) is approximately square-shaped and is approximately zero during unmodulated sequences 4.

Thus, if an unmodulated sequence 4 is received, the received load modulated signal 3 is $$u(t) = \sin(\omega t) + n(t)$$

for the exemplary embodiment

Figure 3:
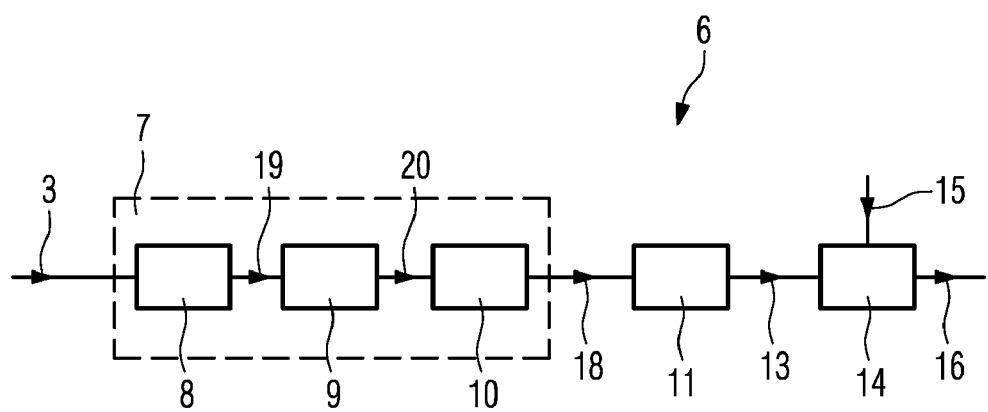
FIG. 3 is a circuit diagram of an embodiment of an inventive demodulator of the receiver of FIG. 1.
Figure 4:
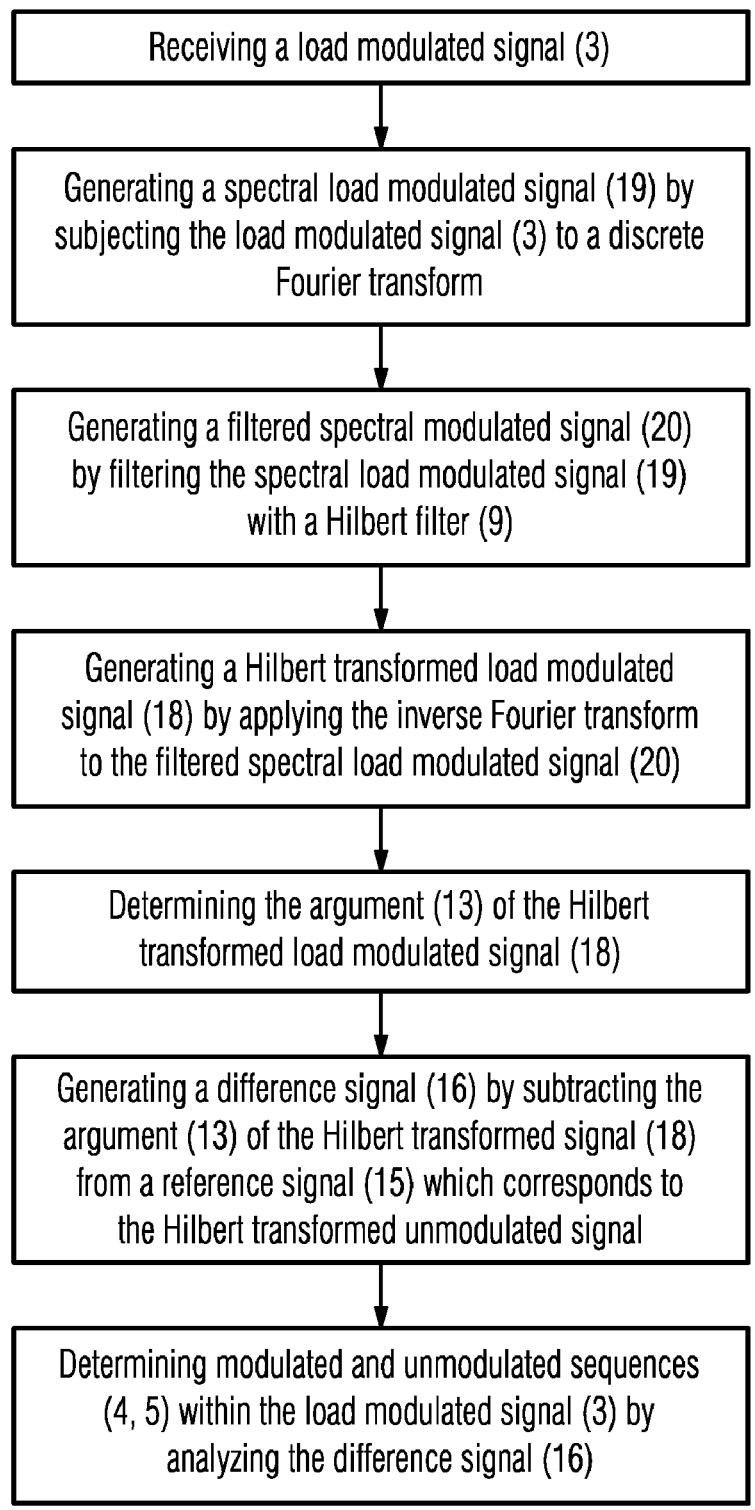
FIG. 4 is a flow chart illustrating the inventive method.

The reader 2 comprises a demodulator 6 for demodulating the received load modulated signal 3 according to the inventive method, which is illustrated by a flow chart depicted in FIG. 4. A circuit diagram of the demodulator 6 is depicted in FIG. 3.

The demodulator 6, which is realized as an appropriately programmed microprocessor for the exemplary embodiment, comprises a Hilbert transformer 7, which subjects the load modulated signal 3 to the Hilbert transform in order to obtain a Hilbert transformed load modulated signal 18. The Hilbert transform is a well known transform and is defined for a one-dimensional real signal, u(t), by the integral:

$$u_H(t) = \frac{1}{\pi} \int_{-\infty}^{\infty} \frac{u(\tau)}{t - \tau} d\tau$$

wherein $u_H(t)$ is the Hilbert transformed signal.

For the exemplary embodiment, the Hilbert transformer 7 is implemented using a series connection of a Fourier transformer 8, a Hilbert filter 9 connected downstream of the Fourier transformer 8, and an inverse Fourier transformer 10 connected downstream of the Hilbert filter 9. Before transforming the load modulated signal 3, which is a continuous signal in the time domain, the load modulated signal 3 is sampled and fed to the Fourier transformer 8. The Fourier transformer 8 transforms the sampled load modulated signal 3 from the time domain into the frequency domain using the discrete Fourier transform and N samples. The discrete Fourier transform is realized by the so called Fast Fourier transform (FFT) for the exemplary embodiment. The output signal of the Fourier transformer 8 is the load modulated signal 3 in the frequency domain, which is referred to as spectral load modulated signal 19.

The spectral load modulated signal 19 is fed to the Hilbert filter 9. The Hilbert filter 9 is a FIR filter having the following discrete transfer function H(k):

$$H(k) = \begin{cases} -j & \text{for } k = 1, 2, \ldots, N/2 - 1 \\ 0 & \text{for } k = 0, \text{ and } N/2 \\ +j & \text{for } k = N/2 + 1, N/2 + 2, \ldots, N - 1 \end{cases}$$

The output signal of the Hilbert filter 9 is referred to as filtered spectral load modulated signal 20 which is fed to the inverse Fourier transformer 10, which subjects the filtered spectral load modulated signal 20 to a discrete inverse Fourier transform. The discrete inverse Fourier transform 10 is realized as a discrete inverse Fast Fourier transform (IFFT) for the exemplary embodiment. The output signal of the inverse Fourier transformer 10 is the Hilbert transformed load modulated signal 18.

Figure 2B:
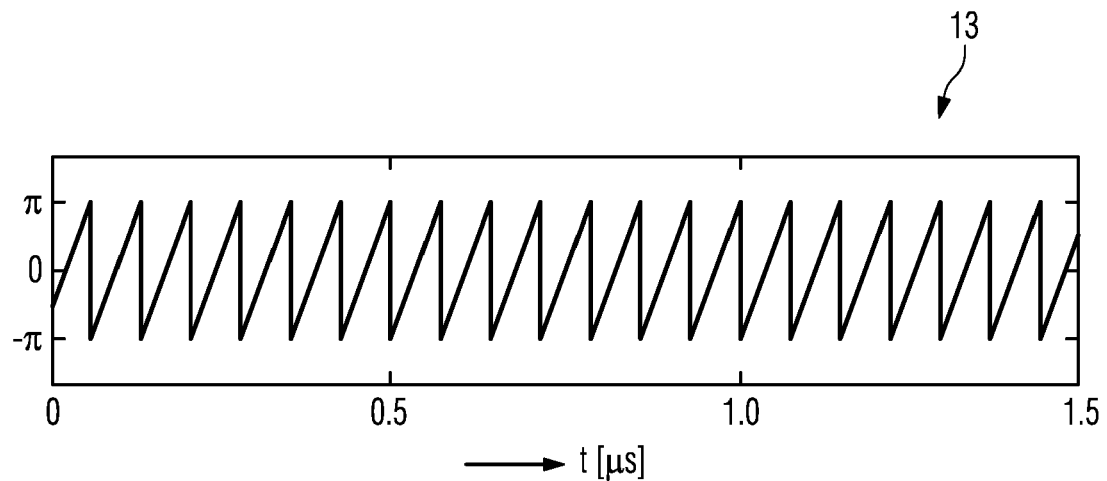

The Hilbert transformed load modulated signal 18 has an argument, which is determined by a functional block 11 of the demodulator 6. The output signal of the functional block 11, which is referred to as argument signal 13, is shown in FIG. 2b. For the exemplary embodiment, the argument signal 13 has the shape of a saw tooth and is within a range of ±π.

For the exemplary embodiment, the argument signal 13 is then fed to a subtractor 14, which subtracts the argument signal 13 from a reference signal 15. The reference signal 15 is the argument of the Hilbert transformed carrier signal sin (ωt). The reference signal 15 is depicted as a solid line in FIG. 2c.

Figure 2C:
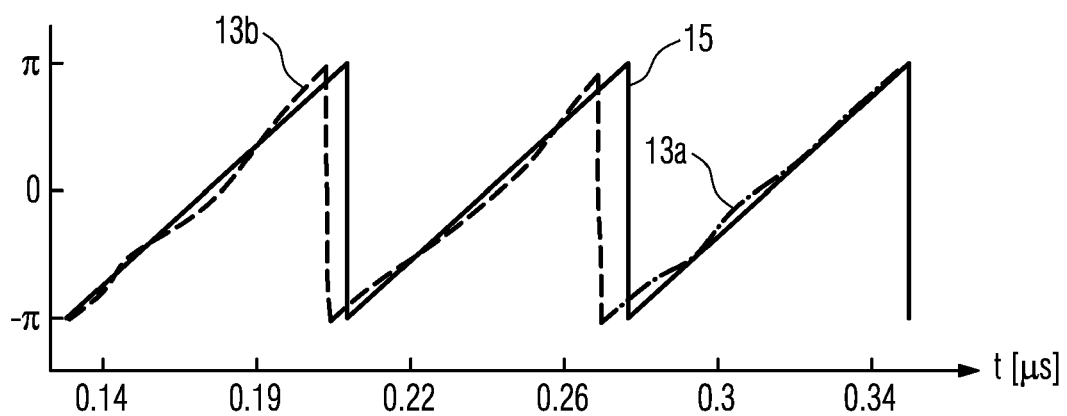
Figure 2D:
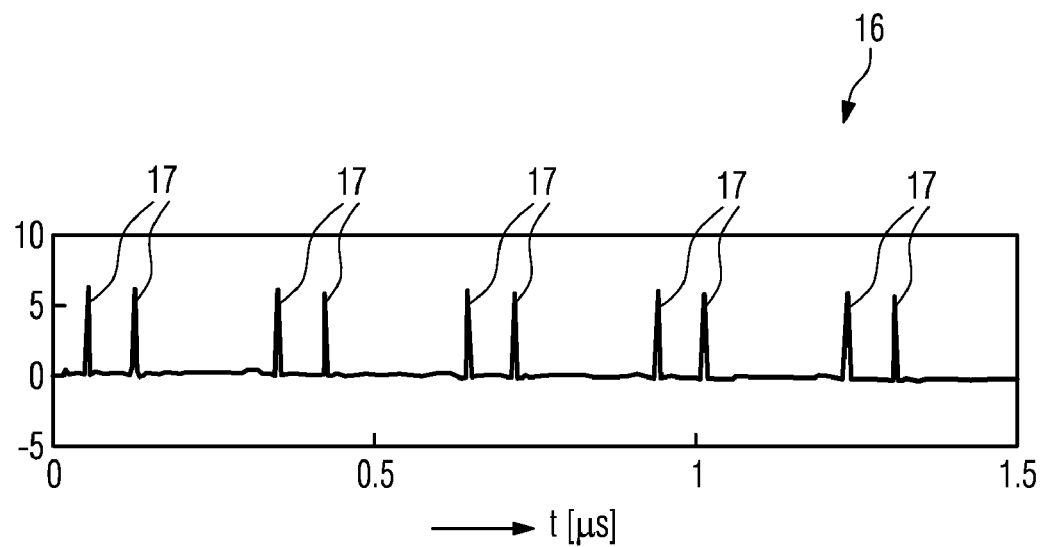

The output signal of the subtractor 14 is the difference between the argument signal 13 and the reference signal 15, is denoted as difference signal 16, and is shown in FIG. 2d.

As already mentioned, the load modulated signal 3 can be modeled as $$u(t) = \sin(\omega t) + q(t) + n(t)$$

for the exemplary embodiment.

The argument (phase) of the Hilbert transformed signal part sin(ωt) has a linear phase and is phase-shifted by −π with respect to the phase of the non-transformed signal sin(ωt). Therefore, the argument signal 13 depicted in FIG. 2b starts at −π.

During unmodulated sequences 4 of the load modulated signal 3, the signal part q(t) is approximately zero. Thus, the load modulated signal 3 during unmodulated sequences 4 can be approximated as $$u(t) = \sin(\omega t) + n(t)$$

for the exemplary embodiment.

Therefore, the argument signal 13 during unmodulated sequences 4 approximately matches the reference signal 15, which is the argument of the Hilbert transformed carrier signal. The argument signal 13 during unmodulated sequences 4 is shown in FIG. 2c as a dash-and-dot line 13a.

During modulated sequences 5, the signal q(t) is unequal to zero and thus affects the argument of the Hilbert transformed load modulated signal 18, as is shown in FIG. 2c. The argument signal 13 during modulated sequences 5 of the load modulated signal 3 is shown as a dashed line 13b. As is obvious from FIGS. 2c and 2d, the difference signal 16 is approximately zero during unmodulated sequences 4 and has peaks 17 during modulated sequences 5 of the load modulated signal 3 for the exemplary embodiment.

Finally, the demodulator 6 is configured to detect these peaks 17 within the difference signal 16 in order to identify modulated and unmodulated sequences 4, 5 within the load modulated signal 3 and thus in order to demodulate the load modulated signal 3, that is to say, to detect the logic "0" and "1" in the load modulated signal 3.

Even though the inventive method the inventive demodulator and the inventive receiver are described above by means of the transponder reader system, the invention is not restricted to such demodulators and receivers. Additionally, the invention is also applicable to other modulated signals than load or amplitude modulated signals, such as frequency or phase modulated signals. The Hilbert transformed load modulated signal 18, generally the Hilbert transformed modulated signal, can also be generated by other means as those described above.

Finally, it should be noted that the above-mentioned embodiments illustrate rather than limit the invention, and that those skilled in the art will be capable of designing many alternative embodiments without departing from the scope of the invention as defined by the appended claims. Particularly, the invention applies to amplitude modulated signals in general. In the claims, any reference signs placed in parentheses shall not be construed as limiting the claims. The words "comprising" and "comprises", and the like, do not exclude the presence of elements or steps other than those listed in any claim or the specification as a whole. The singular reference of an element does not exclude the plural reference of such elements and vice versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A method for demodulating a modulated signal, the method comprising the steps of:
   receiving a modulated signal, which comprises modulated and unmodulated signal sequences and originates from an unmodulated signal;
   generating a Hilbert transformed modulated signal by subjecting said modulated signal to the Hilbert transform;
   comparing at least indirectly said Hilbert transformed modulated signal with a reference signal, which corresponds to the Hilbert transformed unmodulated signal; and
   identifying said modulated and unmodulated signal sequences within said modulated signal based on said comparison.

2. The method of claim 1, wherein said modulated signal is an amplitude modulated signal, which comprises amplitude modulated and unmodulated signal sequences.

3. The method of claim 1, comprising the steps of:
   determining the argument of said Hilbert modulated transformed signal;
   comparing said argument of said Hilbert transformed modulated signal with the argument of said reference signal; and
   identifying said modulated and unmodulated signal sequences within said modulated signal based on said comparing of said arguments.

4. The method of claim 2, comprising as said comparing step, obtaining the difference between said argument of said Hilbert transformed modulated signal and said argument of said reference signal; and identifying said modulated and unmodulated signal sequences within said modulated signal based on said difference.

5. The method of claim 1, wherein generating said Hilbert transformed modulated signal is carried out by:
   generating a spectral modulated signal by subjecting said modulated signal to a discrete Fourier transform;
   generating a filtered spectral modulated signal by filtering said spectral signal with a Hilbert filter; and
   applying the inverse Fourier transform to said filtered spectral signal.

6. A demodulator for demodulating a modulated signal, the demodulator comprising:
   a Hilbert transformer for generating a Hilbert transformed modulated signal of said modulated signal, which comprises modulated and unmodulated signal sequences and originates from an unmodulated signal; and
   a comparing device for comparing said Hilbert transformed modulated signal with a reference signal, which corresponds to the Hilbert transformed unmodulated signal; said demodulator being configured to identify said modulated and unmodulated signal sequences based on said comparison.

7. The demodulator of claim 6, wherein said modulated signal is an amplitude modulated signal, which comprises amplitude modulated and unmodulated signal sequences.

8. The demodulator of claim 6, comprising a functional block for determining the argument of said Hilbert transformed modulated signal, wherein said comparing device is configured to compare said argument of said Hilbert transformed modulated signal with the argument of said reference signal and wherein said demodulator is configured to identify said modulated and unmodulated signal sequences within said modulated signal based on said comparison of said arguments.

9. The demodulator of claim 6, wherein said comparing device is a subtractor for obtaining a difference signal by subtracting said argument of said Hilbert transformed modulated signal from said argument of said reference signal or by subtracting said argument of said reference signal from said argument of said Hilbert transformed modulated signal and wherein said demodulator is configured to identify said modulated and unmodulated signal sequences within said modulated signal by analyzing said difference signal.

10. The demodulator of claim 6, wherein said Hilbert transformer comprises:
    a Fourier transformer for generating a spectral modulated signal by subjecting said modulated signal to a discrete Fourier transform;
    a Hilbert filter for generating a filtered spectral modulated signal by filtering said spectral modulated signal with said Hilbert filter; and
    an inverse Fourier transformer for generating said Hilbert transformed modulated signal by applying the inverse Fourier transform to said filtered spectral modulated signal.

11. A receiver, comprising said demodulator according to claim 6, wherein said receiver is configured to receive a modulated signal to be demodulated by said demodulator.

* * * * *